Jan. 17, 1939.   H. K. HERRICK   2,144,110
TRANSMISSION MECHANISM
Filed Dec. 18, 1936   2 Sheets-Sheet 1
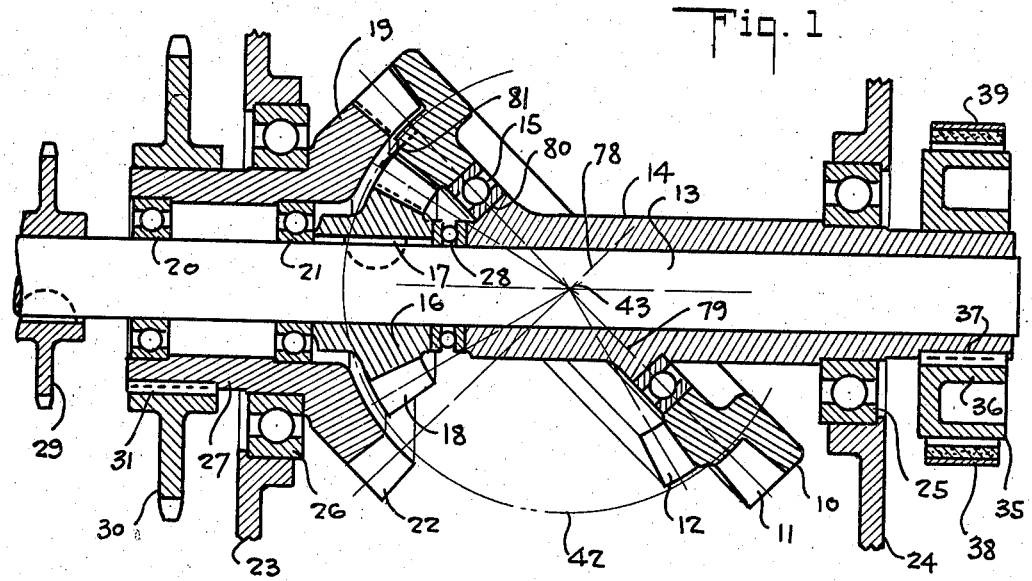
Fig. 1
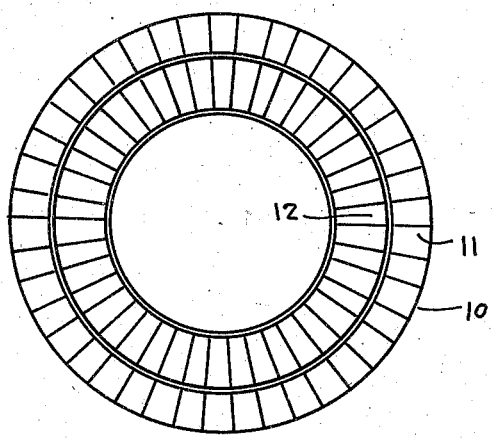
Fig. 2
Fig. 3
INVENTOR
Homer K. Herrick
BY *John Elam*
ATTORNEY Jan. 17, 1939.  H. K. HERRICK  2,144,110
TRANSMISSION MECHANISM
Filed Dec. 18, 1936   2 Sheets-Sheet 2
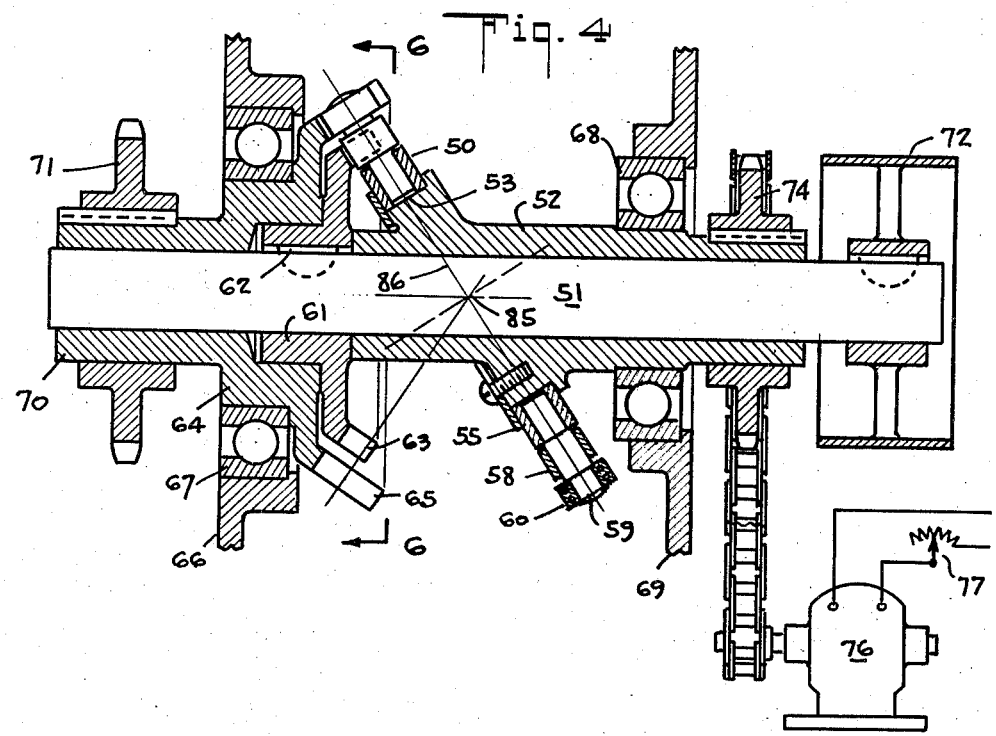
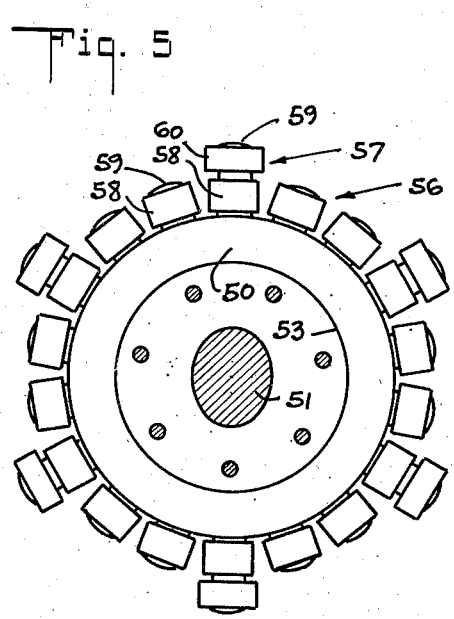
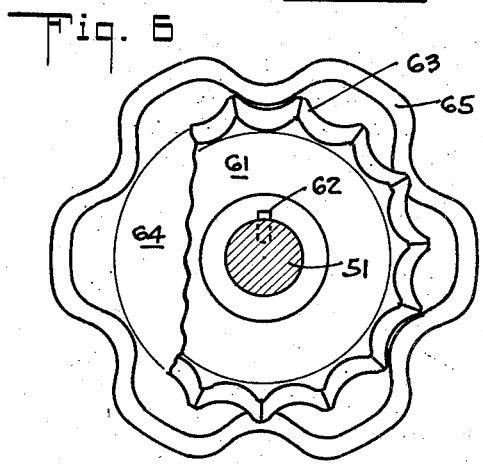
INVENTOR
Homer K. Herrick
BY John Flam
ATTORNEY Patented Jan. 17, 1939

2,144,110

UNITED STATES PATENT OFFICE 2,144,110

TRANSMISSION MECHANISM

Homer K. Herrick, Alhambra, Calif.

Application December 18, 1936, Serial No. 116,564

13 Claims. (Cl. 74—289)

This invention relates to a mechanism for transmitting power between a driving and a driven element; and more particularly to a device that can be so controlled as to provide a range of speeds at which the driven element is operated.

This result is capable of attainment by the aid of intermeshing toothed wheels, at least one of which has an axis that is not fixed, but may revolve about a fixed reference axis. The variation in speed is obtained by determining the speed of revolution of this axis.

It is one of the objects of this invention to provide a transmission mechanism of this character that is simple and compact.

It is another object of this invention to make it possible to vary the speed of the load driving shaft or wheel through a wide range and even to reverse the direction of rotation.

The revoluble wheel, as before stated, is arranged to have its speed of revolution controlled. It is another object of this invention to make it possible to control comparatively large amounts of power by the application of only small forces to the revoluble wheel.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a sectional view, mainly diagrammatic, showing a preferred embodiment of the transmission mechanism;

Fig. 2 is a detail view of the face of one of the toothed wheels, which is utilized in the transmission;

Fig. 3 is an end view of Fig. 1 as viewed from the right;

Fig. 4 is a view, similar to Fig. 1, showing a modified form of the invention;

Fig. 5 is a detail of a toothed wheel used in the form shown in Fig. 4; and

Fig. 6 is a section as seen on the plane 6—6 of Fig. 4, showing the driving and driven gears.

In the form shown in Figs. 1, 2 and 3, a shaft 13 is indicated upon which the wheels forming the transmission are supported. This shaft is illustrated as extending through a casing having the walls 23 and 24. This casing may form a chamber for the accommodation of appropriate lubricant.

In the present instance, at the left hand end of the shaft 13 there is keyed thereto a take-off sprocket 29, which is intended in this form to drive a load. Within the casing there is keyed to the shaft 13 a wheel 16, as by a key 17. This wheel 16 is provided with a series of gear teeth 18. These teeth, as will be hereinafter described, are arranged to mesh with a driving mechanism.

A driving wheel 19 is shown as concentric with the shaft 13. However, it is independently rotatable with respect to the shaft, and for this purpose it is provided with a hub 27 surrounding the left hand portion of the shaft 13 and rotatably supported thereon as by the aid of the ball bearing structures 20 and 21. A ball bearing structure 26 is interposed between the hub 27 and the side 23 of the casing, serving to rotatably support the combined structure, including the shaft 13 and the wheels 16 and 19. A driving torque may be impressed upon the wheel 19 as by the aid of a sprocket wheel 30 joined as by a key 31 to the hub 27 of the wheel 19.

The wheel 19 is also provided with a series of teeth 22. The wheel 19 may be provided with a different number of teeth than the wheel 16. The teeth 18 of the wheel 16 converge toward a vertex 43 falling upon the axis of the shaft 13. The teeth 22 of wheel 19 also converge on the same vertex 43. In this form of the invention the angle of the cone formed by the converging teeth 22 is greater than the angle of the cone formed by the converging teeth 18. Furthermore, for ease of manufacture the pitch circle 42 for both sets of teeth 11 and 12 can be coincident, and can correspond to the outer face of the teeth 18 and the inner face of the teeth 22.

The manner in which rotation is imparted from wheel 19 to wheel 16 in order to drive the shaft 13 will now be described. For this purpose a third wheel 10 having an axis of rotation 78 oblique to the axis of shaft 13 is provided. This wheel 10, as shown most clearly in Figs. 1 and 2, is provided with two sets of concentric teeth 11 and 12 adapted to mesh respectively with the teeth 22 and 18. The line 79 passing through vertex 43 and through the center of the teeth 11 forms a right angle to the oblique axis of rotation 78. Furthermore, the wheel 10 is shown as freely rotatable about the oblique axis 78 as by being mounted for rotation on a sleeve 14 concentric with shaft 13. For the present it may be assumed that sleeve 14 is stationary. The sleeve 14 is provided with an oblique cylindrical surface 80 concentric with the axis of rotation 78 and forming a seat for one of the races of the ball bearing 15 interposed between the wheel 10 and the surface 80. Furthermore, a thrust ball bearing 28 may be interposed between the contiguous faces of sleeve 14 and wheel 16. The sleeve 14 may be supported as by the aid of the ball bearing 25 in the right hand wall 24 of the casing. It is thus clear that the ball bearings 25 and 26 serve rotatably to support the mechanism in the casing formed by the walls 23 and 24.

It is also apparent that if sleeve 14 is restrained against rotation, and shaft 13 being free to rotate within the sleeve 14, the ratio of transmission between wheel 19 and wheel 16 is represented by the ratio of the pitch diameters of the wheels 19 and 16. The pitch diameter of wheel 19 is larger in the present instance than the pitch diameter of wheel 16. Accordingly there is an increase in the ratio of transmission. The wheel 10, rotating on its oblique axis 78, acts merely as an idler to transmit the motion between the two wheels.

An analysis of the forces imposed upon sleeve 14 by the action and reaction of wheels 19 and 16 shows that there is a force tending to rotate the wheel structure 10 about line 79. This force is represented by the reactive force exerted by wheel 16 at a radius corresponding to the line 81 drawn perpendicular to the line 79 from the pitch circle of wheel 16. This torque has a component tending to rotate the sleeve 14 about the axis of shaft 13. This rotative force, if sleeve 14 is not constrained, drives the sleeve 14 in such manner that the oblique axis 78 describes a cone having an axis concentric with the axis of the shaft 13 and having a vertex 43 at the intersection of the axis of the shaft 13 and the oblique axis 78. When sleeve 14 is thus rotating, the ratio of transmission between wheel 19 and wheel 16 is dependent upon the rate and direction of rotation of the sleeve 14. For a definite direction and rate of rotation of sleeve 14, the shaft 13 can in fact be brought to a standstill, due to the planetary relationship between the wheel 10 and the wheels 19 and 16. It is clear, for example, that if sleeve 14 rotates in the same direction and at the same rate as wheel 19, then wheel 16 will also be rotated at the same rate, because the wheel 10 merely serves as a driving connection between the two wheels and there is no relative movement between the intermeshing teeth. In other words, the wheels 16 and 19 and the sleeve 14 rotate as a unit. It is also apparent that the faster sleeve 14 is permitted to rotate, the slower is the rotation of wheel 16.

These general functions are made use of in order to permit the load, even if a heavy one, to be started gradually from standstill. For this purpose a device is provided for controlling the rotation of sleeve 14. This can be obtained, for example, by the aid of a friction brake mechanism illustrated most clearly in Figs. 1 and 3.

Thus mounted on the extreme right hand end of sleeve 14 is a brake drum 35. This brake drum 35 is provided with a hub 36 fastened to the sleeve 14 as by key 37. Arranged to cooperate with the brake drum 35 are a pair of brake shoes 38 and 39 provided with appropriate brake linings. These brake shoes 38 and 39 are shown as pivotally mounted at their lower extremity on a stationary support 82 and are adapted to be compressed or expanded as by the aid of a link 83 joined to the link 40 pivoted to the free end of the brake shoe 39. A connecting link 84 between link 40 and the free end of the brake shoe 39 ensures that a pull upon link 83 will draw the brake shoes 38 and 39 together; and a push toward the left on link 83 will serve to urge the brake shoes 38 and 39 apart. The force applied on link 83 therefore determines the restraint upon the sleeve 14.

In order to start a load from standstill, the sleeve 14 is first permitted to rotate freely, that is, with the brake shoes 38 and 39 released. In this mode of operation, the driving wheel 19 simply drives the sleeve 14 at a rapid rate. Then as the brake shoes 38 and 39 are gradually applied, the rotation of sleeve 14 is gradually stopped and the rotation of wheel 16 is gradually acelerated. Since the speed of rotation of sleeve 14 is quite high for load standstill, the friction control thus provided need be comparatively small in order to bring the sleeve 14 to a standstill and in order to bring the load driving shaft 13 to maximum speed.

In other words, the torque on the sleeve produced by the load reaction is the force that is controlled to get the speed variation. Only a relatively small frictional force is required to hold the sleeve 14 at standstill, in order to cause the wheel 16 to rotate at maximum speed.

The form shown in Figs. 4, 5 and 6 is in general similar to the form just described. However, in this instance the load driving shaft 51 is shown as having a take-off pulley 72 joined to it at the right hand end. The driving wheel 64 has a hub 70 to which is fastened the driving sprocket wheel 71. The driven wheel 61 is fastened as by the aid of key 62 to the shaft 51. As before, the rotating structure is supported by the aid of the walls 66 and 69 of the enclosing casing, as by the aid of the ball bearings 67 and 68.

The sleeve 52 rotatably supports the wheel 50, which has an oblique axis of rotation with respect to the axis of shaft 51. This wheel 50 is mounted for rotation on the cylindrical member 53 concentric with the oblique axis and is restrained from relative axial movement with respect to the cylindrical portion 53 as by the aid of the plate 55 overlying the inner edge of wheel 50.

Furthermore, the wheel 50 is provided with a series of radial stub shafts 59 for rotatably supporting the rollers 58 and 60. These rollers 58 and 60 form two sets of teeth 56 and 57 of unequal number, meshing respectively with teeth 63 and 65 on the wheels 61 and 64. In the present instance the number of rollers 60 coacting with wheel 64 is considerably less than the number of rollers 58 which coact with the wheel 61. For this reason only certain of the posts or stub shafts 59 are extended to accommodate the rollers 60. Furthermore, the axes of rotation of rollers 58 and 60 are concentric and fall along a line 86 converging at the vertex 85. The line 86 is perpendicular to the oblique axis of wheel 50.

Since in the position shown in Fig. 4, the meshing teeth formed by the rollers 58 and 60 are aligned with the hollows between the teeth on the wheels 61 and 64, it is apparent that there is no torque impressed by the reaction of the load on axis 86, because the radius arm has reduced to zero. Accordingly there is no torque impressed on sleeve 52 tending to rotate it about the axis of shaft 51. However, this condition exists only when those hollows between the teeth on both the wheels 61 and 64 are in alignment which are engaged by rollers 58 and 60, as illustrated in Figs. 4 and 6. For other relative positions of the hollows, there is a resultant torque. For one complete rotation of wheel 50 on the cylinder member 53, the torque impressed upon sleeve 52 is thus alternated from zero to a maximum, as the relative tooth positions vary between alignment and a position where the hollow of one wheel is aligned with a tooth on the tooth wheel. This cycle is repeated as often per revolution of the larger 50 as there are number of teeth in the larger wheel.

In the present instance instead of utilizing a friction force for controlling the rotation of sleeve 50, an auxiliary source of motion 76 is provided. This source of motion may be in the form of a small electric motor, the speed of which can be controlled as by a variable resistance 77. It is joined as by the aid of a sprocket wheel 74 to the sleeve 52. It is apparent that the power required by motor 76 is only just sufficient to overcome the differential torques. It is also apparent that a variation in the speed of sleeve 52 provided by the variable speed motor 76 results in a variation in the speed ratio between wheel 64 and wheel 61. It is possible by appropriately choosing the direction and speed of sleeve 52, to bring the load driving wheel 61 to standstill. A variation in the speed of sleeve 52 in either direction from this condition will cause the load shaft 51 to be driven in either direction.

Although certain of the wheels in the embodiments shown have been designated as the driving or driven wheels, it is apparent that these functions may be interchanged.

In the form shown in Figs. 4, 5 and 6, it is apparent that the load is driven both by the wheel 71 and the motor 76. In other words, a pair of prime movers can be used in combination to drive the load.

What is claimed is:

1. A pair of wheels independently rotatable about a common axis, another wheel engaging both said wheels, and having an axis oblique to said common axis, said other wheel being freely rotatable about its axis, means for so mounting said other wheel as to permit the oblique axis to describe a cone surface of revolution about an axis concentric with the common axis, the intersection of the oblique and common axes forming the vertex of the cone, both of said pair of wheels lying on the same side of said vertex, and means for controlling the revolution of said oblique axis.

2. A pair of toothed wheels, independently rotatable about a common axis, another toothed wheel meshing with both of said wheels, and having an axis oblique to said common axis, said other wheel being freely rotatable about its axes, a support for the said other wheel also rotatable about the common axis whereby the oblique axis is revoluble with respect to the common axis to describe a cone surface having its axis concentric with the common axis, the intersection of the oblique and common axes forming the vertex of the cone, both of said pair of wheels lying on the same side of said intersection, and means for controlling the revolution of said oblique axis.

3. A pair of wheels, independently rotatable about a common axis, another wheel engaging both said wheels, and having an axis oblique to said common axis, said other wheel being freely rotatable about its axis, means for so mounting said other wheel as to permit the oblique axis to describe a cone surface of revolution about an axis concentric with the common axis, the intersection of the oblique and common axes forming the vertex of the cone, both of said pair of wheels lying on the same side of said intersection, means for driving one of said pair of wheels, and means for controlling the rate of revolution of the oblique axis.

4. A pair of toothed wheels, independently rotatable about a common axis, another toothed wheel meshing with both of said wheels, and having an axis oblique to said common axis, said other toothed wheel being freely rotatable about its axis, a support for the said other wheel also rotatable about the common axis and providing a means for permitting the oblique axis to revolve with respect to the common axis, to describe a cone surface having its axis concentric with the common axis, the intersection of the oblique and common axes forming the vertex of the cone, both of said pair of wheels lying on the same side of said intersection, means for driving one of said pair of wheels, and means for controlling the rate of revolution of the oblique axis.

5. A pair of wheels, independently rotatable about a common axis, another wheel engaging both said wheels, and having an axis oblique to said common axis, a mounting means for said other wheel so as to permit the oblique axis to revolve with respect to the common axis, to describe a conical surface of revolution about the common axis, means for driving one of said pair of wheels, and means for adjustably restraining the oblique axis from revolving.

6. A pair of wheels independently rotatable about a common axis, another wheel engaging both said wheels, and having an axis oblique to said common axis, means for so mounting said other wheel as to permit the oblique axis to describe a cone surface of revolution about an axis concentric with the common axis, the intersection of the oblique and common axes forming the vertex of the cone, and means for exerting a variable force for restraining said mounting means.

7. A pair of toothed wheels, independently rotatable about a common axis, another toothed wheel meshing with both of said wheels, and having an axis oblique to said common axis, a support for the said other wheel also rotatable about the common axis and providing a means whereby the oblique axis is revoluble with respect to the common axis, to describe a cone surface having its axis concentric with the common axis, the intersection of the oblique and common axes forming the vertex of the cone, and means for exerting a variable force for restraining said support against rotation.

8. A pair of wheels independently rotatable about a common axis, another wheel engaging both said wheels, and having an axis oblique to said common axis, means for mounting said other wheel so that the oblique axis is revoluble to describe a cone surface of revolution about an axis concentric with the common axis, the intersection of the oblique and common axes forming the vertex of the cone, said three wheels having intermeshing teeth and hollows between the teeth, the teeth of one of the concentric wheels impressing a rotative torque upon the wheel with the oblique axis, about an axis represented by the line from the cone vertex passing through the center of the tooth on said wheel with the oblique axis that meshes with the other of said concentric wheels.

9. A pair of wheels independently rotatable about a common axis, another wheel engaging both said wheels, and having an axis oblique to said common axis, means for mounting said other wheel so that the oblique axis is revoluble to describe a cone surface of revolution about an axis concentric with the common axis, the intersection of the oblique and common axes forming the vertex of the cone, each of the concentric wheels having teeth and hollows between the teeth meshing with teeth on the wheel having the oblique axis, said teeth being so arranged that when a pair of hollows between teeth respectively on the concentric wheels are in alignment, they exert no torque upon the third wheel about an axis represented by the line passing from the vertex of the cone through the center of the meshing teeth on the said third wheel.

10. A pair of wheels independently rotatable about a common axis, another wheel engaging both said wheels, and having an axis oblique to said common axis, means for mounting said other wheel so that the oblique axis is revoluble to describe a cone surface of revolution about an axis concentric with the common axis, the intersection of the oblique and common axis forming the vertex of the cone, each of the concentric wheels having teeth and hollows between the teeth meshing with teeth on the wheel having the oblique axis, said teeth being so arranged that when a pair of hollows between teeth respectively on the concentric wheels are in alignment, they exert no torque upon the third wheel about an axis represented by the line passing from the vertex of the cone through the center of the meshing teeth on the said third wheel, the teeth on the wheel having an oblique axis comprising rollers having a common axis passing through the cone vertex.

11. A pair of wheels independently rotatable about a common axis, another wheel engaging both said wheels, and having an axis oblique to said common axis, means for mounting said other wheel so that the oblique axis is revoluble to describe a cone surface of revolution about an axis concentric with the common axis, the intersection of the oblique and common axes forming the vertex of the cone, each of the concentric wheels having teeth and hollows between the teeth meshing with teeth on the wheel having the oblique axis, said teeth being so arranged that when a pair of hollows between teeth respectively on the concentric wheels are in alignment, they exert no torque upon the third wheel about an axis represented by the line passing from the vertex of the cone through the center of the meshing teeth on the said third wheel, the number of teeth on one of the concentric wheels being greater than that on the other concentric wheel.

12. A pair of wheels independently rotatable about a common axis, another wheel engaging both said wheels and freely rotatable about an axis oblique to said common axis, said axes intersecting, both of said pair of wheels lying on the same side of said intersection, and means rotatable about the common axis forming a support for said other wheel, whereby said oblique axis is revoluble about the common axis.

13. A pair of wheels independently rotatable about a common axis, another wheel engaging both said wheels and having an axis oblique to said common axis, said axes intersecting both of said pair of wheels lying on the same side of said intersection, means rotatable about the common axis forming a support for said other wheel, whereby said oblique axis is revoluble about the common axis, and means to control the revolution of the oblique axis.

HOMER K. HERRICK.